(No Model.)

W. M. BRINKERHOFF.
HARROW.

No. 405,459. Patented June 18, 1889.

Witnesses:
G. A. Tauberschmidt,
L. R. Whitaker.

Inventor:
Warren M. Brinkerhoff
By his attys
Whitaker & Prevost

UNITED STATES PATENT OFFICE.

WARREN M. BRINKERHOFF, OF AUBURN, NEW YORK.

HARROW.

SPECIFICATION forming part of Letters Patent No. 405,459, dated June 18, 1889.

Application filed July 31, 1888. Serial No. 281,492. (No model.)

*To all whom it may concern:*

Be it known that I, WARREN M. BRINKERHOFF, a citizen of the United States, residing at Auburn, in the county of Cayuga and State of New York, have invented certain new and useful Improvements in Harrows; and I do hereby declare the following to be a full, clear, and exact description of the invention, such as will enable others skilled in the art to which it appertains to make and use the same.

My invention relates to an improvement in the class of harrows in which a runner is employed to sustain the harrow above the ground, so as to secure clearance-spaces between the teeth of the harrow; and it consists in certain improved constructions of runner, whereby the same is made more effective as a runner, and is also rendered efficient as a guard for the teeth of the harrow.

In the accompanying drawings I have illustrated several modes in which I have contemplated embodying my invention.

Figure 1:
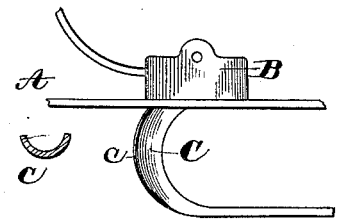
Figure 2:
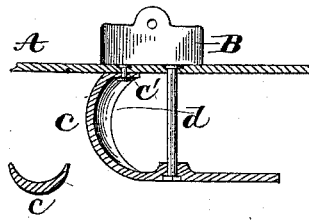
Figure 3:
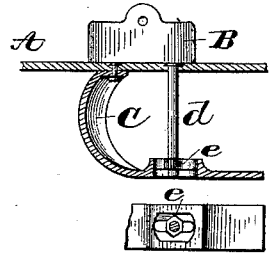
Figure 4:
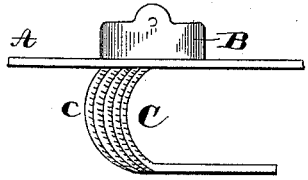

Figure 1 is a view of one form of my improved runner in elevation, with a transverse section of the vertically-disposed portion. Fig. 2 is a vertical and horizontal section of another modified construction. Fig. 3 is a vertical and horizontal section of another form. Fig. 4 is a view showing a corrugated form of construction.

Similar letters of reference indicate identical parts throughout.

In the drawings, A indicates the frame of the harrow, B the tooth-clip, and C the improved runner. The runner is rigid, and the vertically-disposed portion of this runner is of curved or angular form, and the runner is so located that the convex surface of the same is toward the front of the harrow. The vertically-disposed part of the runner is provided with a horizontal flange $c'$, by which it is attached to the frame of the harrow by a bolt, rivet, screw, or any other preferred means.

In the form shown in Fig. 2 the vertically-disposed portion of the runner is curved, as in the form shown in Fig. 1, and the central portion is thickened to sustain greater wear. The runner in this instance is made of lighter material, and the horizontal portion of the same is connected to the frame of the harrow by a brace or brace-bolt $d$. This bolt is to hold the runner in proper position, is secured to both the runner and the frame, and makes the runner absolutely rigid. In place of rigidly securing the lower end of the brace-bolt to the horizontal portion of the runner, I may provide such portion with a recess $e$ and have the lower end of bolt $d$ loosely engage the same, as shown in Fig. 3.

In Fig. 4 the vertically-disposed portion of the runner is ribbed or corrugated to give the same additional rigidity.

What I claim, and desire to secure by Letters Patent, is—

1. A runner for harrows having a horizontally-disposed flat portion and a vertically-disposed portion of convex form in cross-section, substantially as described.

2. A runner for harrows having a horizontally-disposed flat portion and a vertically-disposed portion of convex form in cross-section and of increased thickness centrally to sustain wear, substantially as described.

3. A runner for harrows having a horizontally-disposed flat portion and a vertically-disposed portion convex in cross-section and ribbed or corrugated to give it rigidity, substantially as described.

In testimony whereof I affix my signature in presence of two witnesses.

WARREN M. BRINKERHOFF.

Witnesses:
J. H. WHITAKER,
CHAS. B. QUICK.